US 8,171,498 B2

(12) United States Patent
McInerney (10) Patent No.: US 8,171,498 B2
(45) Date of Patent: May 1, 2012

(54) ADAPTIVE SERVICE FOR HANDLING NOTIFICATIONS AND SYNCHRONIZING DIRECTORIES OF A FILE SYSTEM

(75) Inventor: Peter McInerney, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1896 days.

(21) Appl. No.: 10/877,125

(22) Filed: Jun. 25, 2004

(65) Prior Publication Data

US 2005/0289243 A1 Dec. 29, 2005

(51) Int. Cl.
*G06F 3/00* (2006.01)
*G06F 7/00* (2006.01)

(52) U.S. Cl. .......................... 719/318; 707/610; 707/618

(58) Field of Classification Search .................... None
See application file for complete search history.

(56) References Cited

U.S. PATENT DOCUMENTS

| | | | | |
|---|---|---|---|---|
| 5,991,792 A * | 11/1999 | Nageswaran | ................. | 718/102 |
| 6,125,369 A * | 9/2000 | Wu et al. | ....................... | 707/201 |
| 6,901,145 B1 * | 5/2005 | Bohannon et al. | ............. | 380/44 |
| 7,216,289 B2 | 5/2007 | Kagle et al. | | |
| 2002/0133536 A1 * | 9/2002 | Ramachandran | ............. | 709/201 |
| 2005/0004917 A1 * | 1/2005 | Ueda et al. | .................... | 707/100 |
| 2005/0083942 A1 * | 4/2005 | Vijayaraghavan et al. | | 370/395.4 |
| 2005/0113151 A1 * | 5/2005 | Burke et al. | .................. | 455/574 |
| 2005/0125621 A1 * | 6/2005 | Shah | ............................. | 711/173 |

OTHER PUBLICATIONS

Lemon, Jonathan, "Kqueue: A generic and scalable event notification facility," FreeBSD Project, obtained from http://people.freebsd.org/~jlemon/papers/,May 1, 2001, 14-pages.

* cited by examiner

*Primary Examiner* — Andy Ho
*Assistant Examiner* — Tuan Dao
(74) *Attorney, Agent, or Firm* — Wong, Cabello, Lutsch, Rutherford & Brucculeri LLP (57) ABSTRACT

Adaptive techniques for handling notifications and updating a directory of a file system in a graphical user interface of a computing environment are disclosed. The adaptive techniques include receiving a notification that at least something has been potentially changed in the node. A current time value of the notification is obtained, and a preferred time value or trigger time for responding to the notification is calculated. In a preferred embodiment, the preferred time value is calculated by adding an adjustment or incremental value to a recorded time of the last synchronization performed on the directory. The adjustment or incremental value is preferably calculated by weighting a duration of one or more synchronizations performed on the directory. The adaptive techniques then compare the current time value to the trigger time. If the current time is greater than the trigger time, the Finder and the directory are synchronized. Otherwise, a timer is set to the trigger time, and synchronization of the Finder and the directory is delayed until the trigger time.

73 Claims, 3 Drawing Sheets

ADAPTIVE SERVICE FOR HANDLING NOTIFICATIONS AND SYNCHRONIZING DIRECTORIES OF A FILE SYSTEM

FIELD OF THE INVENTION

The subject matter of the present disclosure generally relates to techniques for controlling operation (e.g., synchronization or up-dating) of a process related to a node in response to changes made to the node that can cause the process to perform labor intensive work. More particularly, the subject matter of the present disclosure relates to techniques for updating a graphical user interface (GUI) display of a file system directory by adaptively synchronizing the directory and the application having the GUI display when notifications of a change made to the directory are received.

BACKGROUND OF THE INVENTION

Figure 1:
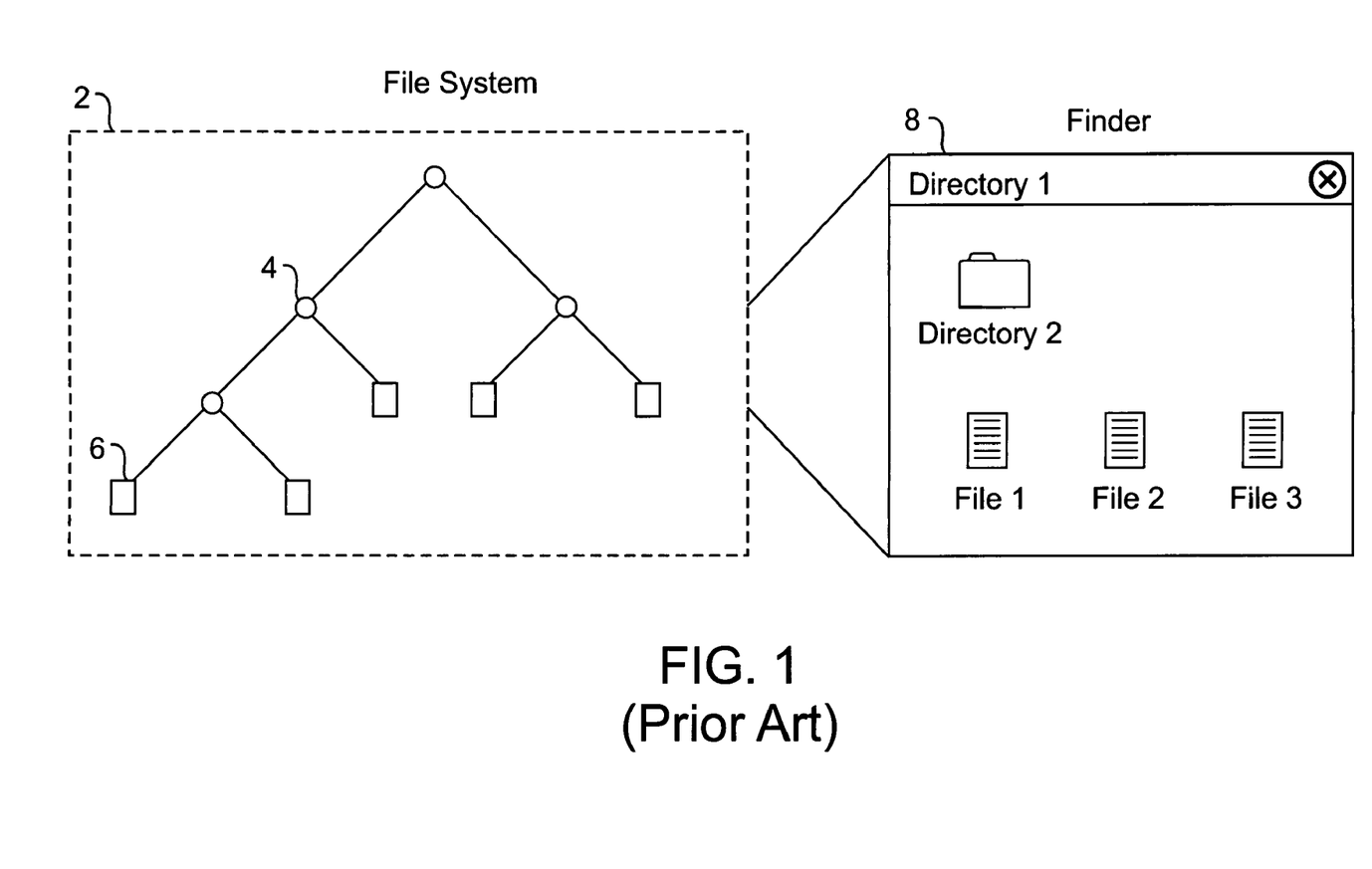
FIG. 1 illustrates a schematic tree of a file system and illustrates a Finder according to the prior art.

Referring to FIG. 1, a file system 2 of a computing environment is schematically represented as a tree of directories 4 and files 6. A directory 4 is a special type of file maintained by the file system 2 that contains a list of entries. A Finder 8 is an application of the computing environment that has a graphical user interface (GUI). The graphical user interface of the Finder 8 allows the user to view the directories 4 and files 6 in the file system 2. For example, the window of the Finder 8 typically displays icons and file names and can display other information about the files, such as file size, application, date last saved, etc. To a user, entries of a directory 4 appear as folders or files having the file names and other related information in the Finder 8. Actually, each entry of a directory 4 is a pointer pointing directly to a file 6 or to an entry in another directory 4.

Various processes in the computing environment can access and change directories 4 and files 6 of the file system 2. While the Finder 8 is open, for example, other processes of the computing environment (e.g., operators, tools, or applications) can manipulate the file system 2 (e.g., add, delete, or edit files 6) so that the directory 4 of files 6 displayed in the Finder 8 is not current. Maintaining an up-to-date display of directories 4 and files 6 of the file system 2 in the Finder 8 can be important. To keep the representation of the file system 2 up-to-date in the Finder 8, some methods for synchronizing the Finder 8 with changes to the directories 2 are used in the art.

One synchronizing method known in the art involves periodically polling a directory 4 at regular intervals to keeping the representation of the directory 4 up-to-date is the Finder 8. The periodic polling involves rereading all the data from the directory 4 and updating the display of the Finder 8 according to some schedule. Unfortunately, such polling is inefficient because intensive input and output operations (e.g., touching the disk of the hard drive and re-reading directories) must be performed even if no files 6 have been changed in the directory 4. Thus, the periodic polling may do unnecessary and intensive work. In addition, polling can be ineffective because the Finder 8 is not updated between intervals when an operator, tool, or application may need an up to date directory.

Another synchronizing method involves detecting specific triggers that indicate the user's current interests in files 6 of the directory 4 and possible changes to those files 6. This synchronizing method is similar to what is performed in Mac OS X Panther and earlier versions of Mac OS X. The triggers can be generated by opening the attached folder, closing the window of the attached folder, moving or resizing the window of the attached folder, placing items into the attached folder, or removing items from the attached folder. The triggers can trigger re-reading of a directory to update the Finder 8. This synchronizing method has the advantage of limiting the polling of the directory 4 and updating the Finder 8 only when the user indicates interest. Unfortunately, changes will not be noticed until there is user-action. The Finder 8 cannot notice a change in a directory 4 unless a trigger is assigned to a particular action, and other processes (users on a network, tools, or applications) lacking triggers may operate in the background of the computer system and may not trigger the update of the finder.

The subject matter of the present disclosure is directed to overcoming, or at least reducing the effects of, one or more of the problems set forth above.

SUMMARY OF THE PRESENT DISCLOSURE

In one embodiment of the present disclosure, an apparatus and method of handling a notification with a service in a computing environment is disclosed. The computing environment has a process and a node. The service performs an operation between the process and the node in response to one or more notifications. The notifications can be generated in response to a change at least potentially made to the node, generated when another process performs an action related to the node, or generated in response to a triggered timer.

In one example, the node can be a directory of a file system, and the process can be a graphical user interface for displaying contents of the directory. A notification can be generated when a change is made to the directory. Thus, the operation can involve synchronizing the graphical user interface and the directory by updating the display of the directory in the graphical user interface.

In another example, the node can be a property store in which an attribute of an object resides, and the process can be capable of changing the attribute of the object. A notification can be generated when a change is made to an attribute of an object. Thus, the operation between the process and the property store can involve updating the attribute of the object in the property store.

In the present embodiment, the disclosed apparatus and method involves obtaining a current time value of a notification and calculating a preferred time value for responding to the notification. The current time value is then compared to the preferred time value, and the operation between the process and the node is initiated based on the comparison of the current time value to the preferred time value.

The preferred time value can be calculated by adding an incremental value to the previous time value. The incremental value can be calculated by weighting a previous duration value, where the previous duration value substantially represents an amount of time for performing at least one previous operation on the node. For example, the previous duration value can substantially represent a discrete amount of time for performing one previous operation on the node. Alternatively, for example, the previous duration value can substantially represent an average amount of time for performing a plurality of previous operations on the node. Weighting the duration value can involve multiplying a factor times the duration value. The factor can be based on a defined threshold or on a priority assigned to the node.

Accordingly, the operation can be initiated when the current time value is at least greater than the preferred time value. In contrast, the operation can be delayed until the preferred time value when the current time value is at least less than the preferred time value. To delay the operation until the preferred time value, a timer can be set to trigger at the preferred time value.

This and other embodiments of the present disclosure can be implemented as a computer-readable medium having computer executable instructions.

In another embodiment of the present discloser, an apparatus and method of performing an operation on a node in a computing environment is disclosed. The method includes generating a notification related to the node and obtaining a current time value of the notification. The method further involves calculating a preferred time value for responding to the notification and comparing the current time value to the preferred time value. The, the operation on the node is initiated based on the comparison of the current time value to the preferred time value.

In another embodiment of the present disclosure, an apparatus and method of handling a notification with a service in a computing environment is disclosed. The computing environment has a process and a node. The service performs an operation between the process and the node in response to one or more notifications. When a notification is received, a latency value and a duration value are determined. The latency value substantially represents an expanse of time from a time value of one previous operation performed on the node to a current time value of the notification. The duration value substantially represents an amount of time for performing at least one previous operation on the node. Then, a ratio of the duration value to the latency value is determined. If the ratio is at least greater than a defined threshold, then operation between the process and the node is initiated. However, the operation between the process and the node can be delayed if the ratio is at least less than the defined threshold.

In another embodiment of the present disclosure, a service for performing an operation between a process and a node in a computing environment is disclosed. The service receives one or more notifications related to the node, and the service handles the one or more notification according to a method. The method of handling the one or more notifications involves obtaining a previous time value, and a previous duration value. The previous time value is from a previous operation performed on the node. The previous duration value substantially represents an amount of time for performing at least one previous operation on the node. An incremental value is then calculated by multiplying a weighted criterion times the previous duration value. In addition, a trigger time for responding to the notification is calculated by adding the incremental value to the previous time value. Then, a current time value is compared to the trigger time. If the current time value is at least greater than the trigger time, the operation is initiated. If the current time value is at least less than the trigger time, then the operation is delayed until the preferred time value.

The foregoing summary is not intended to summarize each disclosed or potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

While the disclosed adaptive synchronizing service and techniques are susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

A. Software Stack

Figure 2:
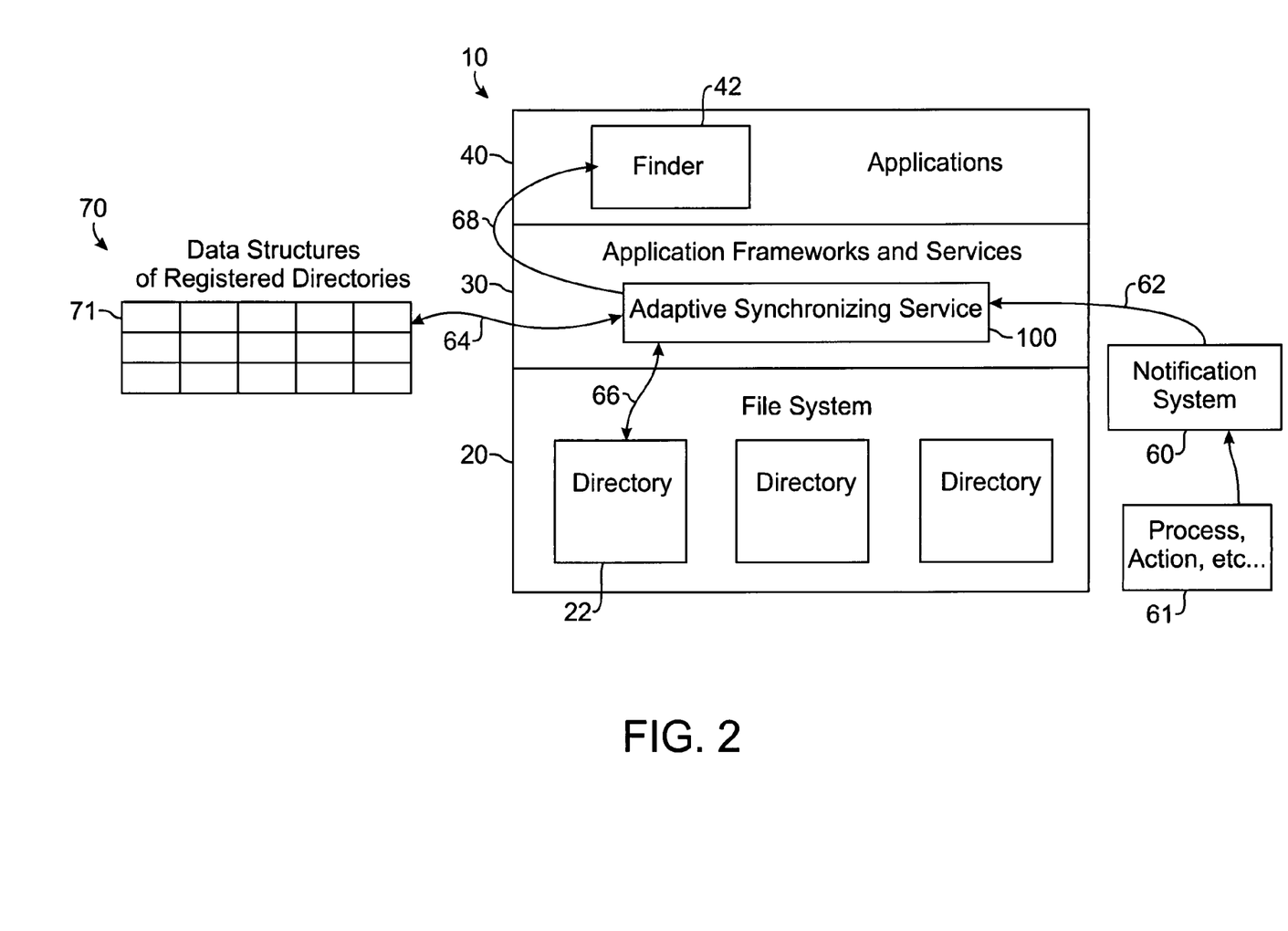
FIG. 2 illustrates a software stack having an adaptive synchronizing service and data structures according to certain teachings of the present disclosure.

Referring to FIG. 2, an example of a software stack 10 is illustrated having an adaptive synchronizing service, system, or process 100 according to certain teachings of the present disclosure. Embodiments of the service 100 disclosed herein include software. As such, the software stack 10 of FIG. 1 expresses an embodiment of common computing software architecture in a plurality of layers 20, 30, and 40. These layers 20, 30, and 40 are not intended to be exclusive in any way but rather illustrative. This is especially true for layer-type diagrams of software stacks, which software developers tend to express in somewhat differing ways. Some layers of software and firmware are omitted from the software stack 10 of FIG. 1. The illustrated software stack 10 is intended to imply that software elements shown in a layer use resources from the layers below and provide services to layers above. However, in practice, not all components of a particular software element may behave entirely in that manner.

With those caveats, the software stack 10 includes a file system layer 20, an application frameworks and services layer 30, and an application layer 40. The file system layer 20 includes a plurality of directories 22, which are maintained by the file system 20 of the computing environment. The directories 22 contain entries (not shown) that are pointers pointing to files or to entries in other directories. Layer 30 is an amalgamation of functions typically expressed as two layers (e.g., applications frameworks layer and application services layer). For purposes of our discussion, both these layers provide high-level and often functional support for application programs that reside in the highest layer 40. One application in the application layer includes a finder application ("Finder") 42. The Finder 42 is a software application having a graphical user interface for displaying contents of the file system 20. For example, the Finder 42 can display files in the directories 22 with icons and can give various information on the file, such as name, file size, last update, creating application, etc.

In addition, data structures 70 are illustrated in FIG. 2. The data structure 70 can be a table, tree, or other data file attached to the frameworks and service layer 30 and residing in memory of the computing environment. The data structures 70 store data on the directories 22 for the service 100. As described in more detail below, the data stored in the data structures 70 includes a token identifying a specific directory 22, a time representing when the last synchronization of the specific directory 22 was performed, a duration representing the amount of time or average time required to perform the last synchronization(s) on the specific directory 22, and a Boolean value representing whether a self-generated synchronization has been requested for the directory 22 as described below.

B. Embodiment of Adaptive Synchronizing Service

The adaptive synchronizing service 100 is a service within the application frameworks and services layer 30. The service 100 performs adaptive techniques for handling notifications according to certain teachings of the present disclosure. Using the adaptive techniques, the service 100 updates the representation of the directories 22 in the Finder 42 when files (not shown) in the directories 22 of the file system 20 are changed. In the adaptive techniques, a notification 62 from a notification system 60 is generated when something in the file system 20, such as contents of the directory 22 have been changed. The synchronizing service 100 then adaptively determines whether to respond directly to the notification 62 by synchronizing the Finder 42 and the directory 22 or whether to delay synchronization until a later time. The adaptive determination by the service 100 can depend on the priority of the directory 22 or on the available resources of the computing environment.

1. Notification System

When something in a directory 22 is changed by a process, action, application, or the like 61, a notification 62 is generated from the notification system 60. Preferably, directories 22 of the file system 20 are registered so that changes to them prompt the notification system 60 to generate a notification 62. For example, the notification 62 is generated when an application changes something in the directory 22, or the notification 62 is self-generated by the service 100. The notification 62 only notifies the service 100 that something in the directory 22 has been changed and does not indicate what has been changed in the directory 22, which maintains efficiency of the computer system by limiting memory and processing usage.

The notification system 60 is preferably an open source notification system, and the notification system 60 and notifications 62 can be similar to notifications for a computing environment that are known in the art. In one embodiment, for example, the notification system 60 and notifications 62 can be based on the kqueue mechanism, which is a generic event delivery facility known in the art. Teachings of the kqueue mechanism can be found in the paper, "Kqueue: A Scalable and Generic Event Delivery Facility," which was presented at the BSDCon 2000 conference in Monterey, Calif. by Jonathan Lemon and which is incorporated herein by reference. The notifications 62 can communicate kernel-to-application and application-to-application events. Kernel-based notifications provide the opportunity for significant performance gains, by eliminating the need for time-consuming polling and making it easy for tools and services to find out about such items as changed directory files and network disconnects.

In general, the service 100 synchronizes the directory 22 and the Finder 42 by accessing (66) the specified directory 22 and updating (68) the contents of the specified directory 22 in the Finder 42. The amount of work needed to synchronize a directory 22 is substantially proportional to the contents in the directory 22 because the entire contents of the directory 22 must be re-read when synchronizing. If the service 100 were to directly synchronize the directory 22 and the Finder 42 after each notification 62, the service 100 could very quickly perform nothing other than synchronizing a large directory 22 that is changing frequently. Therefore, the service 100 is preferably designed to handle potentially large sizes and/or frequently changing directories 22. To improve effectiveness and efficiency, the service 100 preferably includes adaptive techniques for tracking the history of previous synchronizations of the directories 22 and for synchronizing the directories 22 according to defined criteria based on that tracked history.

2. Responding to Notifications

As noted above, the notification 62 simply notifies the service 100 that something in the directory 22 has been changed or that synchronization of the directory is due. Before automatically synchronizing the directory 22, however, the adaptive service 100 accesses (64) data in a specified data structure 71 for the directory indicated in the notification 62. The data structure 71 is tagged for a specific directory 22 using a pointer or other token. The notification 62 is given the token of the registered directory 22 when generated so that the specific data structure 71 for the registered directory 22 can be readily accessed. From the data structure 71, the service 100 obtains a previous synchronization time and obtains a duration of one or more synchronizations previously performed on the registered directory 22. The duration can simply be the last duration taken to synchronize the directory 20, can be a moving average of the last few synchronizations of the directory 22, or can be a total time spent synchronizing all directories 22.

The service 100 then compares a current time to the previous synchronization time to calculate a latency period (i.e., the time between the present notification 62 and the last synchronization of the directory 22). The service 100 uses the duration of the last synchronization to estimate what a current duration would be required to read the same directory 22. Given this data, the service 100 calculates estimates a percentage of resources, such as CPU usage, that would be used if the directory 22 and the Finder 42 were immediately synchronized. The calculated percentage is then compared to a predefined threshold to determine whether synchronization can be done immediately or be delayed. The following equation may be used to determine whether the calculated percentage is below a predefined threshold:

$$\text{Threshold \%} \geq \frac{\text{Duration}}{\text{Latency}} * 100,$$

where "Duration" is the amount of time or average time for performing the last synchronization on the directory 22 and where "Latency" is the difference between the current time and the time of the last synchronization was performed on the directory 22. If the percentage of "Duration over Latency" is below the predefined threshold, then the synchronization proceeds. For example, suppose the "Duration" of the last synchronization task of reading the directory 22 was one second. If the predefined threshold value is set to be 10%, then the service 100 will preferably respond to the current notification only after a "Latency" period of 10-seconds to maintain the threshold value of 10%. Thus, if the current notification is received ten seconds or more from the time the last synchronization was performed, the service 100 will read (66) the directory 22 to update (68) the Finder 42. Every time the service 100 performs a synchronization, the service 100 updates the data in the data structure 70 to reflect the most recent time of last synchronization and most recent duration for performing the synchronization on the node.

However, suppose the "Duration" of the last synchronization task of reading the directory 22 is one second and the "Latency" (time since last reading the directory) is two seconds, then responding to the notification 62 would give a response value of 50%, which is well above the threshold value (e.g., 10%) preferred by the service 100. In this case, the service 100 would either ignore the current notification 62 or delay synchronization. If the threshold is exceeded, it is possible to invert the calculation and determine at what future time the synchronization would cause the CPU usage to drop below the threshold value. As noted in the above example, if the "Duration" of the last synchronization is one second and the predefined threshold value is 10%, then the service 100 would preferably respond to a notification only after ten seconds. In this case, a timer can be set to trigger synchronization at the appropriate time (e.g., within ten seconds) and defer the synchronization until then. If a notification is received in the interim and the timer is still pending on that directory, the interim notification can simply be ignored.

The net effect is that if the service 100 receives change notifications 62 at a low rate, then the service 100 performs the synchronizations immediately. Yet, if the service 100 receives notifications 60 more frequently, the amount of effort the service 100 devotes to synchronizing the directories 22 is essentially capped. There may be some lag in changes reflected in the Finder 42 because the changes will be synchronized in batches. However, this adaptive technique will never lose changes to the directory 22, because synchronization between the directory 22 and the Finder 42 at any particular time will reflect all intervening changes of the directory 22.

This adaptive synchronizing technique overcomes some of the problems of periodic polling techniques and user-triggered polling techniques described above in the Background Section of the present disclosure. In particular, the adaptive technique of the service 100 overcomes the inefficiencies that can cause repeated up-dates of the directories 22 in Finder 42 when changes have not even occurred in the directories 22. Moreover, the adaptive technique of the service 100 overcomes the inefficiencies by placing a cap on the total percentage of available resources that are devoted to synchronizing.

E. Preferred Embodiment of Adaptive Synchronizing Service and Data Structure Referring to FIG. 3, an embodiment of the adaptive synchronizing service 100 and a data structure 70 according to certain teachings of the present disclosure are schematically illustrated. The service 100 includes a Notification Handler 110, an Adjusted Sync Function 120, a Synchronize Function 130, and a Timer Function 140. The data structure 70, schematically shown in tabular form, includes a representation or token of a node ("node" field 72), a time for the last synchronization ("Last Sync Time") field 74, a Boolean value, e.g., TRUE or FALSE, indicating whether a future synchronization is requested for the node ("Sync Requested" field 76), and a duration of the synchronizations performed on the node ("Duration" field 78). In the discussion that follows, a node represents a class of object to be synchronized. For example, a node may be a directory, a property store, the visible contents of a window, or any data structure that needs to be updated from external data. In the discussion that follows, time represents some unit of time measurement, such as clock time, CPU cycles, or other time measure.

1. Calling Notification Handler

Figure 3:
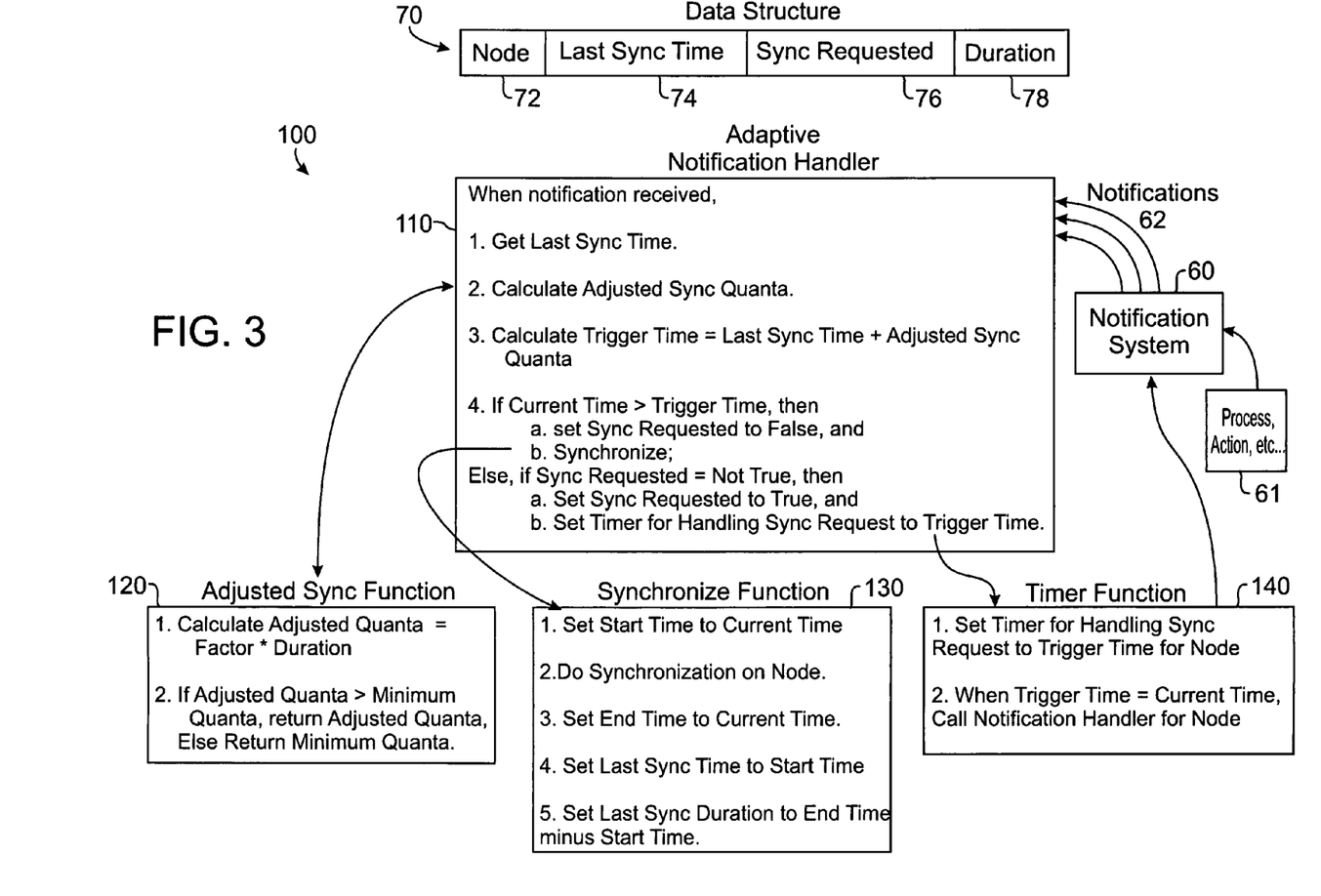
FIG. 3 schematically illustrates an embodiment of the adaptive synchronizing service and data structures according to certain teachings of the present disclosure.

The Notification Handler 110 receives a change notification 62 when something has been at least potentially changed in a node (e.g., directory of the file system). As noted above, the notification system 60 can generate the notification 62 when a process, action, application, or the like 61 alters or manipulates the node. For example, an application or some other process making a change to a registered directory can cause the notification system 60 to generate the change notification 62. Alternatively, the Notification Handler 110 can be called when a set timer triggers and causes the notification system 60 to generate a notification 62, such as discussed below. The notification 62 simply indicates that a change has been made and carries no "payload" or additional information related to the change.

2. Calculating an Adjusted Sync Quanta

When called, the Notification Handler 110 obtains the Last Sync Time from field 74 of the data structure 70 and calculates an Adjusted Sync Quanta or incremental time value using the Adjusted Sync Function 120. The Adjusted Sync Quanta is used to calculate a preferred time value or Trigger Time, which is then used to determine whether synchronization of the node is due. In the Adjusted Sync Function 120, the Adjusted Sync Quanta is a time value calculated using available data in the data structure 70 and a weighted criterion for the specific node. In particular, the Adjusted Sync Quanta is calculated by multiplying an adjustment factor (weighted criterion) with the Duration from the field 78 of the data structure 70 for the node. The adjustment factor (weighted criterion) can be fixed. Alternatively, the adjustment factor (weighted criterion) can be dynamic and can be changed in accordance with changes in the computing environment. The changes in the computing environment can include, but are not limited to, changes in an application associated with the node, fluctuations in available processing resources, varying interests of the user, operations of various processes on the specific node, the traffic of a network system, availability of a server, or input/output operations performed on a hard disk or other memory device.

In one embodiment, the adjustment factor can be based on a priority or importance of a specified node (e.g., directory). For example, a GUI application in the computing environment can display multiple windows with each window showing the contents of a different directory. To better allocate available processing time, it is preferred to synchronize a foreground window more frequently than a background window. Therefore, the different nodes (e.g., directories) can be assigned priorities based on their importance (i.e., whether the directory is displayed in a foreground window or a background window of the GUI application). Priority of a node can be fixed or can be dynamically assigned based on changes in the computing environment.

In an alternative embodiment, the adjustment factor can be a threshold value based on a preferred consumption of processing recourses used to synchronize the node. For example, the threshold value can be based on the time required to synchronize the node relative to the time between synchronizations performed on the node. The threshold value can be fixed for all nodes or can be dynamically assigned in a given instance based on changes in the computing environment.

The calculated Adjusted Sync Quanta is preferably greater than or equal to a predefined minimum value. Therefore, the Adjusted Sync Quanta is compared to a minimum quanta value. If the Adjusted Sync Quanta is greater than the minimum quanta value, then the Adjusted Sync Quanta is returned to the Notification Handler 110. If the Adjusted Sync Quanta is not less than the minimum quanta value, then the Adjusted Sync Quanta is set to the minimum quanta value and is returned to the Notification Handler 110. Making the Adjusted Sync Quanta not less than minimum quanta value ensures that the same node is never synchronized any more often than specified by the minimum quanta.

3. Calculating a Trigger Time

The Notification Handler 110 calculates a Trigger Time by adding the Last Sync Time in field 74 of the data structure 70 using the Adjusted Sync Quanta returned from the Adjusted Sync Function 120. The Trigger Time represents the preferred time from the last synchronization of the node at which synchronizing the node would best meet the preferred priority of the node or the preferred usage of processing resources. The Notification Handler 110 then obtains a current time and compares the Trigger Time to the current time. If the current time is greater than the Trigger Time, the Notification Handler 110 sets a Sync Request in field 76 of the data structure 70 to FALSE, and the node is synchronized using the Synchronize Function 130 described below. Otherwise, if a synchronization is not already scheduled to occur at a set trigger time (i.e., the Sync Request in field 76 of the data structure 70 is not TRUE), then the Sync Request is set to TRUE. In addition, a timer for handling the synchronization request is set to the Trigger Time using the Timer Function 140 described below.

4. Synchronize Function

As noted above, the Notification Handler 110 accesses the Synchronize Function 130 if the current time is greater than the Trigger Time, which means synchronizing the node is currently warranted. The Synchronize Function 130 actually does the necessary synchronization of the node (e.g., directory) and is only called from Notification Handler 110. During synchronization, a start time is set to a current time obtained. A routine then does the actual synchronization on the node. For example, the synchronization can involve reading a directory of a file system and updating a graphical user interface to reflect the new reading of the directory, as described in previous examples. Although the present embodiment involves a synchronizing operation (e.g., reading a directory and updating a graphical user interface), the adaptive techniques of the present invention can involve operations other than synchronizing. For example, the other operations can include, but are not limited to, updating the attributes in a property store, or redrawing the contents of a window in response to changes in the underlying data that it displays.

When synchronization is complete, an end time is set to a subsequent current time obtained. The start time determined previously is then stored in the data structure 70 as the Last Sync Time in field 74, and the difference between the end time and the start time is applied to the Duration in field 78 of the data structure 70 for the node. For example, the difference can directly substitute a previous value for the Duration in field 78. Alternatively, the difference can be added to a value of previous synchronizations stored in an accumulative field (not shown) of the data structure 70 and divided by a total number of synchronizations stored in another field (not shown) to determine a running average for storing as the Duration in field 78.

5. Timer Function

As noted above, the Notification Handler 110 accesses the Timer Function 140 if the Sync Requested in field 76 of the data structure 70 was previously not TRUE. The Timer Function 140 sets a timer for handling the requested synchronization. If the Notification Handler 110 receives an interim notification 62 while the timer is pending, the Notification Handler 110 can first determine if a Sync Request in field 76 of the data structure is TRUE. If the request is TRUE, then the Notification Handler 110 recognizes that a timer and a request for performing synchronization are already pending. Therefore, the Notification Handler 110 can ignore the interim notification 62. In the Timer Function 140, the timer triggers when a current time equals the stored Trigger Time, causing the Notification Handler 110 to perform its algorithm. For example, triggering of the timer can cause the notification system 60 to generate a new notification 62 that is received by the Notification Handler 110.

6. Exemplary Code

Exemplary or pseudo code for performing adaptive techniques for handling notifications and synchronizing according to certain teachings of the present disclosure is provided below. In the implementation disclosed herein for synchronizing file systems, multiple threads are used, and techniques known in the art involving locking primitives are used to ensure correct behavior of the multiple threads. For clarity, the exemplary code omits details that can be inferred from the present disclosure or that can be specific to a particular implementation. Such details fall within the purview of a person skilled in the art of programming. In the exemplary code, a node represents a class of object to be synchronized (e.g., directory or property store). In the exemplary code, time, which is also used for durations, represents some unit of time measurement. For example, time can be clock time, CPU cycles, or other time measurement used in computing.

```
// Node represents the class of the object to be
// synchronized. Time represents some unit of time
// measurement and is also used for durations.
//--------------------Get-Set last SyncTime-------------
// Get and set the last sync time for node. This time is
// considered a field of node.
void SetLastSyncTime( Node node, Time time );
Time GetLastSyncTime( Node );
//--------------------Get-Set Last SyncDuration-------------
// Get and Set the last SyncDuration. The Duration returned
// may in fact be the actual duration for the last sync of
// node or it could be running average of the last few syncs
// of node or it could even be a duration which is a running
// average of all syncs of all nodes. This information is
// considered a stored field, either of node or globally
// available.
void SetLastSyncDuration( Node node, Time time );
Time GetLastSyncDuration( Node );
//---------------------Get-Set SynchRequest-----------------
// Get and set a flag that indicates that a sync timer
// already exists. This is considered a field of node.
Boolean GetSyncRequested( Node node );
void SetSyncRequested( Node node, Boolean requested );
//---------------------GetAdjustedSyncQuanta----------------
// Return a time based on available data and the specific
// node that specifies the adjusted quanta. The returned
// quanta is always greater than or equal to a pre specified
// minimum quanta.
Time GetAdjustedSyncQuanta( Node node )
{
        //---------------------Get Adjustment------------------
        // GetAdjustment may return a simple constant such as
        // 10 which would correspond to a 10% threshold or it
        // could return a different value depending on whether
        // the node was considered high priority or not. For
        // example, if the active window was showing node it
        // could be higher priority than if node was shown in a //
        background window.
        int factor = GetAdjustment( node );
        Time adjustedQuanta = factor * GetLastSyncDuration( node );
        return ( adjustedQuanta > minimumQuanta) ? adjustedQuanta :
        minimumQuanta;
}
//---------------------Timer----------------------
// Set a timer to call NotificationHandler at the
// triggerTime. This will ultimately cause Synchronize( node
// ) to be called at that time.
void SetTimerToHandleSyncRequest( Node node, Time triggerTime );
```

-continued

```
//--------------------Synchronize--------------------------
// Synchronize does the necessary synchronization. It is
// only ever called from NotificationHandler
void Synchronize( Node node )
{
        Time startTime = GetCurrentTime( );
        DoSync( node ) ; // does the actual syncing
        Time endTime = GetCurrentTime( );
        SetLastSyncTime( node, startTime );
        SetLastSyncDuration( node, endTime – startTime );
}
//----------------NotificationHandler----------------------
// NotificationHandler is called when a lower level change
// notification occurs or as a result of a self generated
// notification that occurs when the set timer fires.
void NotificationHandler( Node node )
{
        Time lastSyncTime = GetLastSyncTime( node );
        Time adjustedSyncQuanta = GetAdjustedSyncQuanta(node);
        Time triggerTime = lastSyncTime + adjustedSyncQuanta;
        Time currentTime = GetCurrentTime( );
        //------------------------------------------------
        // If we have exceeded the trigger threshold then sync
        // right away
        //------------------------------------------------
        if( currentTime > triggerTime )
        {
            SetSyncRequested( node, false );
            Synchronize( node );
        }
        //------------------------------------------------
        // Otherwise if we haven't already got a sync scheduled
        // set one to fire at the trigger time
        //------------------------------------------------
        else if( !GetSyncRequested( node ) )
        {
            SetSyncRequested( node, true );
                SetTimerToHandleSyncRequest( node, triggerTime );
        }
}
```

F. Implementations Other than Synchronizing Directory and an Application

The disclosed adaptive techniques for handling notifications are not restricted to synchronizing or updating directories of a file system and a graphical user interface as disclosed in the exemplary implementation of the present disclosure. Rather, the disclosed adaptive techniques for handling notifications can be applied to any system where low-level notifications can cause a recipient (e.g., process, user interface, etc.) of the notifications to perform unbounded work.

In another example implementation, the adaptive techniques for handling notifications of the present disclosure can be used when attributes associated with a file or object are changed. The attributes typically reside in a property store of the computing environment. The property store is a database that contains various attributes of the objects. When a user changes an attribute, such as the label color, of an object, the entire property store typically must be updated (i.e., "written out"). Therefore, making a small attribute change can result in an intensive response by a recipient process because the property store is often large. Certainly, the property store encompasses more than the attribute that has been changed. In this situation, the adaptive techniques of the present disclosure can be useful to prevent unbounded, inefficient work in updating or writing out the properties store.

When a user sets a label color, for example, a notification can be generated in response. When receiving the notification, the adaptive techniques of the present disclosure can determine whether to write out the property store immediately or to delay responding to the changed attribute until a later time. The time required (duration) for writing of the property store the last time an attribute was changed can be stored in a data structure for the property store. The adaptive techniques can then calculate the amount of time (latency) between the currently requested attribute change and the last time the property store was written out. Then, the adaptive techniques can determine the ratio of the duration over the latency and compare the ratio to a predefined threshold. If the requested change is premature (i.e., the ratio exceeds the predefined threshold), the attribute change can be stored in memory and writing out the property store can be delayed. Subsequent changes to attributes can be stored until the ratio does not exceed the predefined threshold or until a set timer triggers the process of writing out the property file. In this way, the property store is written out with all of the changed attributes. In addition, the CPU usage can be controlled and any repeated, expensive writing out of the property store can be minimized when small changes or frequent changes are made to the attributes of the property store.

F. Conclusion

The present disclosure amply illustrates to a computer programmer of skill how to make and use the disclosed adaptive techniques for handling notifications and the accompanying user interfaces and other functional aspects. Therefore, programming such techniques, accompanying user interfaces, and other functional aspects is a routine matter to a computer programmer of skill and can be accomplished using many different programming languages and within the context of many different operating systems. Of course, the disclosed techniques would be ultimately coded into a computer code and stored on a computer-readable media, such as a compact disk, a tape, stored in a volatile or non-volatile memory, etc.

The foregoing description of preferred and other embodiments in the present disclosure is not intended to limit or restrict the scope or applicability of the inventive concepts conceived by the Applicant. In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. A method of handling one or more data change notifications with a service in a computing environment, the service performing a data synchronization operation between a process and a node, the process being high-level in the computing environment, the node being low-level in the computing environment, the notification indicative of a change at the node, the data synchronization operation performing work in the computing environment with respect to synchronizing information corresponding to at least a portion of the change, the method comprising the steps of:
    (a) obtaining at least one of the one or more data change notifications related to the node;
    (b) calculating a preferred time value for responding to the at least one notification, the preferred time value calculated based at least partially on a duration of time taken to perform at least one previous data synchronization operation on the node;
    (c) comparing a current time value to the preferred time value; and
    (d) initiating the data synchronization operation between the process and the node based on the comparison, the data synchronization operation synchronizing information corresponding to at least a portion of a change to information associated with the node.

2. The method of claim 1, wherein the at least one data change notification is generated in response to a change at least potentially made to the node.

3. The method of claim 1, wherein the at least one data change notification is generated when another process performs an action related to the node.

4. The method of claim 3, wherein the at least one data change notification is generated in response to a triggered timer.

5. The method of claim 1, wherein the node includes a directory of a file system.

6. The method of claim 5, wherein the process includes a graphical user interface for displaying contents of the directory.

7. The method of claim 6, wherein the data synchronization operation between the process and the node includes updating the contents of the directory in the graphical user interface of the process.

8. The method of claim 1, wherein the node includes a property store in which an attribute of an object resides.

9. The method of claim 8, wherein the process is capable of changing the attribute of the object.

10. The method of claim 9, wherein the data synchronization operation between the process and the property store includes updating the attribute of the object in the property store.

11. The method of claim 1, wherein step (b) comprises calculating the preferred time value based on a previous time value when the at least one previous data synchronization operation was performed on the node.

12. The method of claim 11, wherein calculating the preferred time value based on the previous time value comprises adding an incremental value to the previous time value.

13. The method of claim 12, wherein the incremental value is calculated by weighting a duration value, the duration value being based on the duration of time taken to perform the at least one previous data synchronization operation on the node.

14. The method of claim 13, wherein the duration value represents a discrete amount of time taken to perform the at least one previous data synchronization operation on the node.

15. The method of claim 13, wherein the duration value represents an average amount of time taken to perform a plurality of the at least one previous data synchronization operations on the node.

16. The method of claim 13, wherein weighting the duration value comprises multiplying a factor times the duration value.

17. The method of claim 16, wherein the factor is based on a defined threshold.

18. The method of claim 16, wherein the factor is based on a priority assigned to the node.

19. The method of claim 1, wherein step (d) comprises initiating the data synchronization operation when the current time value is at least greater than the preferred time value.

20. The method of claim 1, wherein step (d) comprises delaying the data synchronization operation until the preferred time value when the current time value is at least less than the preferred time value.

21. The method of claim 20, wherein delaying the data synchronization operation until the preferred time value comprises setting a timer to trigger at the preferred time value.

22. A method of performing a data synchronization operation on a node in a computing environment, the data synchronization operation preformed in response to one or more change notifications related to the node, the method comprising the steps of:
(a) obtaining at least one of the one or more change notifications related to the node, the node including at least one of a file system directory, a property store, the at least one change notification pertaining to a change in underlying data associated with the node and being displayed as window content;
(b) calculating a preferred time value for responding to the at least one change notification, the preferred time value calculated based at least partially on a duration of time taken to perform at least one previous data synchronization operation on the node;
(c) comparing a current time value to the preferred time value; and
(d) initiating, based on the comparison, the data synchronization operation to synchronize data changes at the node with the window content.

23. The method of claim 22, wherein step (b) comprises calculating the preferred time value based on a previous time value when the at least one previous data synchronization operation was performed on the node.

24. The method of claim 23, wherein calculating the preferred time value based on the previous time value comprises adding an incremental value to the previous time value.

25. The method of claim 24, wherein the incremental value is calculated by weighting a duration value, the duration value being based on the duration of time taken to perform the at least one previous data synchronization operation on the node.

26. The method of claim 25, wherein the duration value represents a discrete amount of time taken to perform the at least one previous data synchronization operation on the node.

27. The method of claim 25, wherein the duration value represents an average amount of time taken to perform a plurality of the at least one previous data synchronization operations on the node.

28. The method of claim 25, wherein weighting the duration value comprises multiplying a factor times the duration value.

29. The method of claim 28, wherein the factor is based on a defined threshold.

30. The method of claim 28, wherein the factor is based on a priority assigned to the node.

31. The method of claim 22, wherein step (d) comprises initiating the data synchronization operation when the current time value is at least greater than the preferred time value.

32. The method of claim 22, wherein step (d) comprises delaying the data synchronization operation until the preferred time value when the current time value is at least less than the preferred time value.

33. The method of claim 32, wherein delaying the data synchronization operation until the preferred time value comprises setting a timer to trigger at the preferred time value.

34. A non-transitory computer-readable medium having computer executable instructions for performing the method recited in claim 22.

35. A method of synchronizing a directory and a user interface in a computing environment in response to one or more change notifications related to the directory, the directory represented in the user interface, the method comprising the steps of:

(a) obtaining at least one of the one or more change notifications related to the directory;

(b) calculating a preferred time value for responding to the at least one notification, the preferred time value calculated based at least partially on a duration of time taken to perform at least one previous synchronization of the directory represented in the user interface;

(c) comparing a current time value to the preferred time value; and (d) synchronizing the representation of the directory in the user interface or delaying the synchronization based on the comparison.

36. The method of claim 35, wherein the at least one change notification is generated in response to a change at least potentially made to the directory.

37. The method of claim 35, wherein the at least one change notification is generated when another process performs an action related to the directory.

38. The method of claim 37, wherein the at least one change notification is generated in response to a triggered timer.

39. The method of claim 35, wherein step (b) comprises calculating the preferred time value based on a previous time value when the at least one previous synchronization was performed on the directory.

40. The method of claim 39, wherein calculating the preferred time value based on the previous time value comprises adding an incremental value to the previous time value.

41. The method of claim 40, wherein the incremental value is calculated by weighting a duration value, the duration value being based on the duration of time taken to perform the at least one previous synchronization on the directory.

42. The method of claim 41, wherein the duration value represents a discrete amount of time taken to perform the at least one previous synchronization on the directory.

43. The method of claim 41, wherein the duration value represents an average amount of time taken to perform a plurality of the at least one previous synchronizations on the directory.

44. The method of claim 41, wherein weighting the duration value comprises multiplying a factor times the duration value.

45. The method of claim 44, wherein the factor is based on a defined threshold.

46. The method of claim 44, wherein the factor is based on a priority assigned to the directory.

47. The method of claim 35, wherein step (d) comprises synchronizing the representation of the directory in the user interface when the current time value is at least greater than the preferred time value.

48. The method of claim 35, wherein step (d) comprises delaying the synchronization until the preferred time value when the current time value is at least less than the preferred time value.

49. The method of claim 48, wherein delaying the synchronization until the preferred time value comprises setting a timer to trigger at the preferred time value.

50. A non-transitory computer-readable medium having computer executable instructions for performing the method recited in claim 35.

51. A method of handling one or more data change notifications with a service in a computing environment, the service performing a data synchronization operation between a process and a node, the process being high-level in the computing environment, the node being low-level in the computing environment, the data change notification indicative of a change at the node, the operation performing work in the computing environment with respect to the change, the method comprising the steps of:

(a) determining a latency value for the node, the latency value representing an expanse of time from a time value of one previous data synchronization operation performed on the node to a current time value;

(b) determining a duration value for responding to at least one of the one or more data change notifications, the duration value being based on a duration of time taken to perform at least one previous data synchronization operation on the node;

(c) determining a ratio of the duration value to the latency value; and (d) responding to the at least one data change notification by initiating the data synchronization operation between the process and the node if the ratio is at least greater than a defined threshold.

52. The method of claim 51, further comprising (e) delaying the data synchronization operation between the process and the node if the ratio is at least less than the defined threshold.

53. The method of claim 52, wherein delaying the data synchronization operation between the process and the node comprises setting a timer to trigger at a trigger time.

54. The method of claim 51, wherein the at least one data change notification is generated in response to a change at least potentially made to the node.

55. The method of claim 51, wherein the at least one data change notification is generated when another process performs an action related to the node.

56. The method of claim 55, wherein the at least one data change notification is generated in response to a triggered timer.

57. The method of claim 51, wherein the node includes a directory of a file system.

58. The method of claim 57, wherein the process includes a graphical user interface for displaying contents of the directory.

59. The method of claim 51, wherein the duration value represents a discrete amount of time for performing the last data synchronization operation on the node.

60. The method of claim 51, wherein the duration value represents an average amount of time for performing a plurality of previous data synchronization operations on the node.

61. The method of claim 51, wherein the defined threshold is based on processing usage in the computing environment.

62. The method of claim 51, wherein the defined threshold is based on a priority assigned to the node.

63. A non-transitory computer-readable medium having computer executable instructions for performing the method recited in claim 51.

64. A non-transitory computer-readable medium having computer executable instructions for performing the method recited in claim 1.

65. A service for performing a data synchronization operation between a process and a node in a computing environment, the service receiving one or more notifications related to the node and handling the one or more notifications according to a method, the method of handling the one or more notifications, the process being high-level in the computing environment, the node being low-level in the computing environment, the notification indicative of a change at the low-level node, the data synchronization operation performing work in the computing environment with respect to the change, the method comprising the steps of:

(a) receiving at least one of the one or more notifications related to the node;
(b) obtaining a previous time value when at least one previous data synchronization operation was performed on the node, and a previous duration value being based on a duration of time taken to perform the at least one previous data synchronization operation on the node;
(c) calculating an incremental value by multiplying a weighted criterion times the previous duration value;
(d) calculating a trigger time for responding to the at least one notification by adding the incremental value to the previous time value;
(e) comparing a current time to the trigger time; and
(f) initiating the data synchronization operation if the current time is at least greater than the trigger time; and
(g) delaying the operation until the trigger time if the current time is at least less than the trigger time.

66. The service of claim 65, wherein step (f) further comprises determining a current duration value representing an amount of time for performing the initiated data synchronization operation on the node.

67. The service of claim 66, further comprising updating the previous duration value with the current duration value.

68. The service of claim 65, wherein the previous duration value represents an average amount of time for performing a plurality of the at least one previous data synchronization operations on the node.

69. The service of claim 65, wherein step (g) comprises setting a timer to trigger at the trigger time.

70. The service of claim 65, further comprising initiating the data synchronization operation when the timer triggers.

71. The service of claim 65, wherein the weighted criterion is based on a priority assigned to the node.

72. The service of claim 65, wherein the weighted criterion is based on processing resources of the computing environment.

73. A non-transitory computer-readable medium having computer executable instructions for performing the method recited in claim 65.

* * * * *